Nov. 6, 1934.  A. S. DIACK  1,979,371
PNEUMATIC TIRE CONSTRUCTION
Filed April 29, 1932
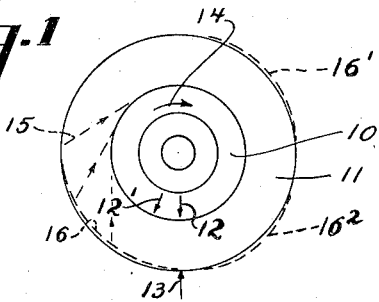
Fig.1
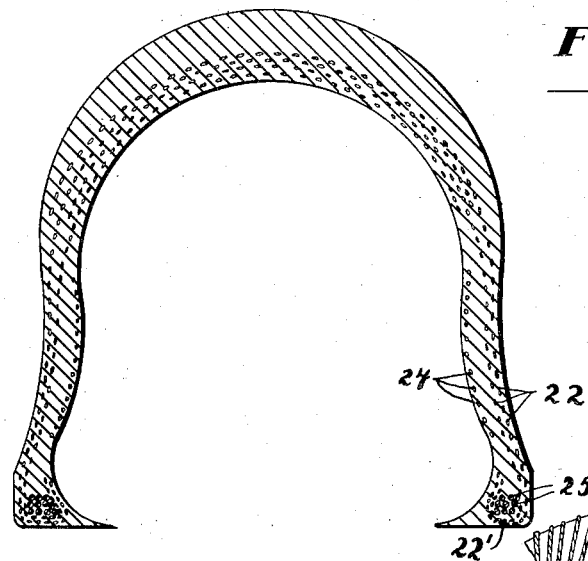
Fig.2
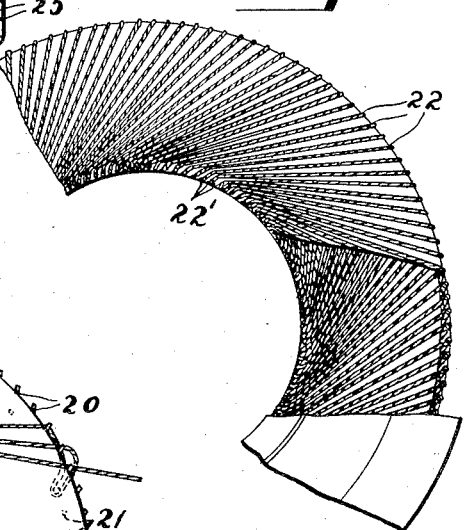
Fig.3
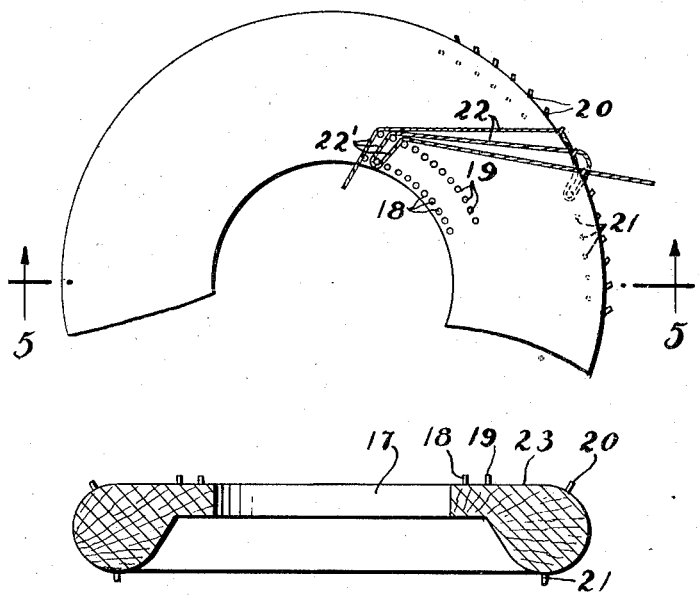
Fig.4
Fig.5
INVENTOR
Alexander S. Diack
BY Swan, Frye & Hardesty
ATTORNEY Patented Nov. 6, 1934

1,979,371

UNITED STATES PATENT OFFICE 1,979,371

PNEUMATIC TIRE CONSTRUCTION

Alexander S. Diack, Detroit, Mich.

Application April 29, 1932, Serial No. 608,243

4 Claims. (Cl. 152—13)

This invention relates to pneumatic tire constructions, and has for one of its objects provision of an improved tire especially suitable for automobile use and adapted to run more smoothly and safely at high speeds than ordinary pneumatic tires as now made.

Another object of my invention is the provision of such a tire which is adapted for embodiment in the large size low air pressure types yet which holds its concentricity at all speeds, and does not tend to become eccentric or bulge at certain points as do tires of the more usual forms.

A further object is the provision of a cord tire of increased strength and efficiency by reason of a novel and improved arrangement of its cords in such manner that they act in tension in the direction of the greatest strain which is imposed upon the tire in service, and further tend to tie all points upon the periphery of the carcass against undesired outward movement beyond the point of symmetry, and thus prevent the tire from materially changing its shape when run at high speed. This feature I regard as highly important, inasmuch as tires of the more common constructions now in general use are so designed that they become eccentric when run at high speed and thus not only tend to cause unsteadiness, "jumping" and "wabbling" of a wheel upon which they are installed, but the bulges or eccentricities are forced back under the wheel and produce a scrubbing action between tire and road which causes undue wearing of the tire. Their failings my invention is adapted to correct.

Other objects and advantages will be apparent from the following description, wherein reference is made to the accompanying drawing illustrating a preferred embodiment of my invention, and wherein similar reference numerals designate similar parts throughout the several views.

In the drawing:

Figure 1 is a somewhat diagrammatic side elevational view of an automobile wheel and a tire mounted thereon;

Figure 2 is a radial cross-sectional view of a tire incorporating the principles of my invention;

Figure 3 is a fragmentary side view of a winding form illustrating somewhat diagrammatically one manner in which the cords of the tire may be wound;

Figure 4 is a fragmentary side view of a winding form illustrating somewhat diagrammatically one manner in which the cords of the tire may be wound, and Figure 5 is a diametrical cross-sectional view of such a winding form.

Referring now to the drawing: Reference character 10 designates a vehicle wheel, the details of construction of which are unimportant as they form no part of my invention. Reference character 11 designates a pneumatic tire which we may momentarily consider to be one of the conventional varieties having a carcass reinforced by cords disposed non-tangentially. When the wheel is at rest, the point 12 at the rim or bead edge of the tire is in radial alignment with the point 13 on the periphery. As soon as torque is applied to drive the wheel in the direction indicated by the arrow 14, however, the point 12 tends to advance (in the direction of rotation) with respect to the point 13, to the position, for example, indicated exaggeratedly by the arrow 12'. This is of course due to the resistance of the road and the resiliency of the tire. The pull which the rim exerts upon the periphery in driving the wheel is mainly tangential, as indicated by the dotted lines 15, and due to the resistance of the road and the direction of the pull, the result is a tendency to flatten a portion of the tire, substantially as indicated by the dotted line 16. A complementary bulging of the diametrically opposite portion of the periphery tends to occur, as at 16', and this is augmented or an additional bulging introduced farther around the tread toward the point 13, as at $16^2$, caused by the "piling up" action naturally resulting from the road resistance. This effect is of course heightened by centrifugal force and throws the wheel out of symmetrical balance which results in unsteadiness in its running, and causes premature wear due to the tendency of the wheel to ride over the bulge $16^2$. Tires constructed according to my improved design, however, are so made that the advance indicated by the points 12—12', and the resultant distortion, cannot take place. The wheel therefore runs true at all speeds.

As will be apparent from an inspection of Figure 3, I accomplish the desired result by so arranging the cords that they extend substantially tangentially to the rim in both directions, serving to provide for direct tangential pull, in the direction indicated by the lines 15 of Figure 1, as well as providing a positive two-directional tying-in of every point upon the periphery in a manner adapted to prevent its material outward movement. In order to provide additional safeguard against such outward movement of the tread of the tire, I preferably form the side walls substantially straight, as indicated in Figure 2. The side walls may be initially formed somewhat inwardly bowed, if desired, as therein shown, so that they tend to remain straight when the tire is inflated and under load. The side walls may in addition be reinforced for this purpose if desired, as by the cords 24.

My preferred manner of winding the cords is best illustrated in Figures 3, 4, and 5. As there shown, a form 17, which may be of wood, may be provided, with winding pins 18, 19, 20, 21 projecting therefrom. The cord, 22, extends outwardly from the inner row of pins 18 substantially radially to the pins 19, about which they are angled and from which they extend out substantially tangentially with respect to the circumferential line upon which the pins are disposed. It will be noted that the surface 23 of the form is flat. The cord extends over the top or tread portion of the form, is looped over one of the pins 21, and returns to the next succeeding pair of pins 18—19, about which it is similarly wound, and returns to the next pin 21, etc. The intermediate pins 20 are merely for bracing, to prevent slippage of the cords when angularly pulled over the form under tension, and may or may not be used, as desired. The completed circumferential winding is generally semi-toroidal in shape, as shown in Figures 4 and 5, and may be temporarily maintained in this shape either by dipping the same in gum rubber or by basting or sewing temporary woof threads through the cords. After completion this cord assembly is removed from the form by merely pulling the loops off the pegs, and the tire carcass is built up of a number of such disc-like assemblies oppositely positioned, so that the cord portions running along the flat side walls 23 of the forms are built into the side walls of the tire, while the curved portions extending between the pins 20 and 21 overlap to form a tread portion having twice as many cord layers as the side walls, as shown in Figure 2. Between each cord layer, and between the successively overlapping tread portions of each layer, may be interposed layers of resilient rubber, in the usual or any desired fashion. The portions 22' of the cord loops running substantially radially between the pins 18—19 may be wrapped around the bead reinforcement of the tire, which may comprise wires 25, to tie the cords to the bead.

The cords will be seen to diverge toward the periphery, by reason of their tangential arrangement, and because of this and the opposed assembly of the built-up discs of reenforcing cords, the cords are amply spaced from each other by cushioning layers of rubber in the tread portion of the tire, despite the presence of twice as many cords in the tread as in either side wall. Thus flexible side walls are provided, in accordance with the best practice in line construction, even if a special side wall cord structure, as 24, adapted to limit outward bowing of the walls is provided. The overlapping cords of the tread reenforcement may of course be interfitted if desired, but I preferably arrange them in superposed layers in the manner shown.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a pneumatic tire having a bead portion, side walls flexible both inwardly and outwardly, and a tread portion, a reenforcing cord structure extending outwardly substantially tangentially from the bead and into the tread portion through the side walls, the side wall portions being so inbent and reenforced as to be maintained substantially flat by normal pressure within the tire, whereby the cords lie along substantially straight tangential lines and tie the tread against outward movement when the tire is inflated.

2. In a pneumatic tire having a bead portion, side walls flexible both inwardly and outwardly, and a tread portion, a cord structure extending outwardly substantially tangentially from the bead through the side walls and into the tread portion, the side walls being normally in-bowed when relaxed to such extent that normal air pressure within the tire holds the walls substantially flat, whereby the cords lie along substantially straight tangential lines and tie the tread against outward movement when the tire is inflated.

3. In a pneumatic tire having inner and outer bead portions, substantially flat side walls and a tread portion, a cord structure comprising a plurality of strands of cord each secured at one end in one bead, extending substantially tangentially outwardly therefrom through the side walls and looped over the tread portion, certain of the cords extending outwardly in opposite directions to tie the tread and bead at fixed relative distances, whereby the cords lie along substantially straight tangential lines and tie the tread against outward movement when the tire is inflated.

4. In a pneumatic tire having a bead portion, resilient side walls freely flexible both inwardly and outwardly, and a tread portion, a reenforcing cord structure the component cords of which extend outwardly substantially tangentially from the bead through the side walls and into the tread portion, the side walls being normally inbowed to such extent before inflation that normal air pressure within the tire holds said walls substantially flat, the tread and the cord structure therewithin being of substantially semicircular cross section, whereby the cords normally occupy straight tangential paths through the side walls, and the cords in the tread portion follow and maintain the semicircular cross-sectional contour of the tread when the tire is in service, the cord structure thereby functioning to tie the tread against outward movement when the tire is inflated.

ALEXANDER S. DIACK.